April 4, 1961 D. R. SAND 2,977,766
DE-SLUDGING DEVICE
Filed July 5, 1957
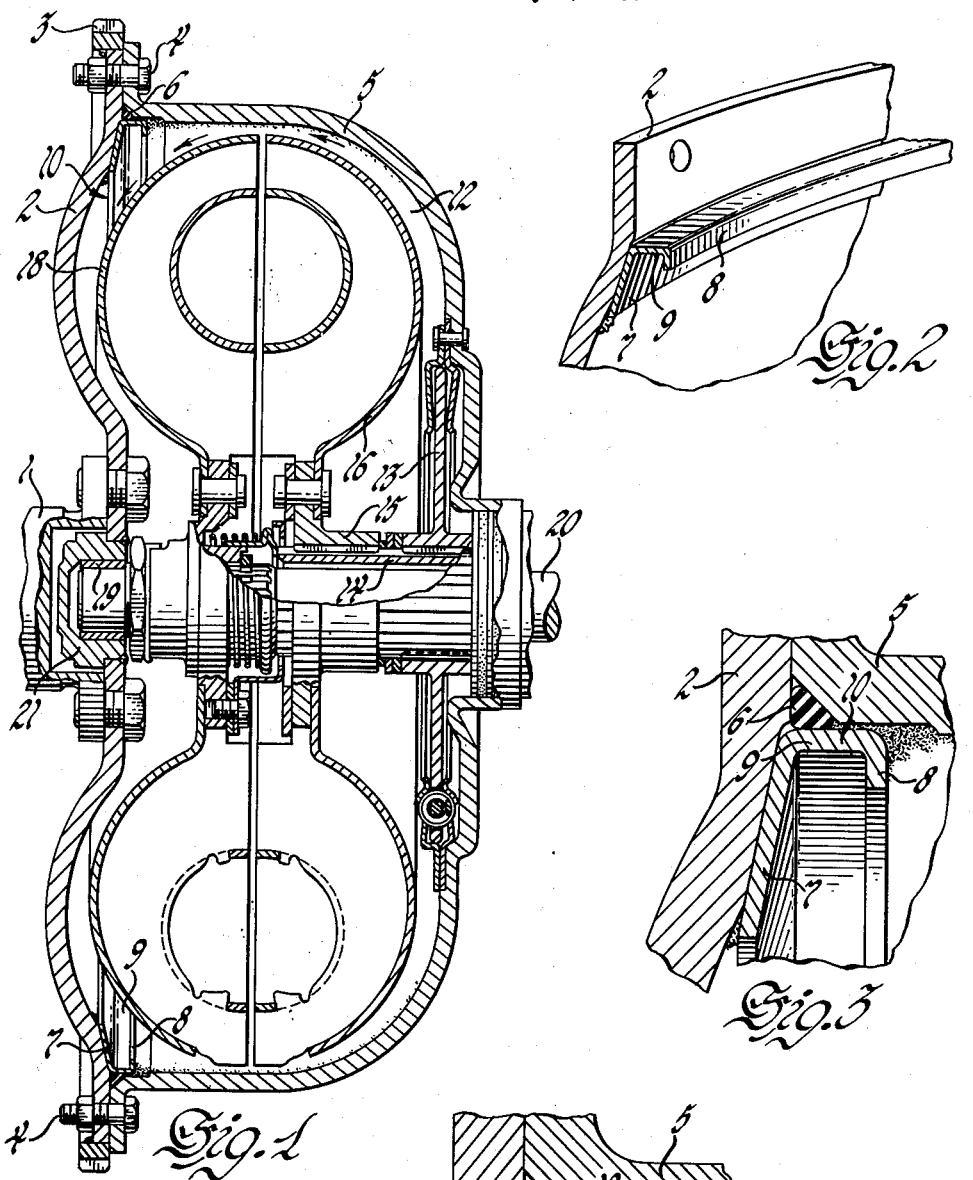
INVENTOR
Darrel R. Sand
BY W. C. Middleton
ATTORNEY.

United States Patent Office 2,977,766
Patented Apr. 4, 1961

2,977,766

DE-SLUDGING DEVICE

Darrel R. Sand, Royal Oak, Mich., assignor to General Motors Corporation, Detroit, Mich., a corporation of Delaware Filed July 5, 1957, Ser. No. 670,208

2 Claims. (Cl. 60—54)

This invention relates to improvements in hydrodynamic power transmitting devices such as fluid torque converters and clutches adapted to utilize a fluid such as, for example, oil for its working fluid.

An object of this invention is to provide in a hydrodynamic power transmitting device, means for collecting sludge or other foreign matter from the working fluid of the device.

Another object of the invention is to provide in a hydrodynamic power transmitting device, means to collect foreign matter from the working fluid under action of centrifugal force applied to the working fluid.

A further object is to provide in a rotatable housing containing oil, an annular channel adapted to collect sludge or other foreign matter from the oil contained in the housing.

An additional object is to provide in a rotatable housing formed of a pair of detachable housing sections and containing working fluid such as oil, sealing means for preventing escape of fluid through the plane of attachment of the two housing sections together with an annular sludge collecting member carried by one of the housing sections and cooperating with said sealing means to insure compression of the sealing means when said detachable housing sections are secured together in assembled relationship.

A further object of this invention is to provide in a rotatable housing containing working fluid such as oil, an annular channel member presenting a side wall to the path of oil flow adapted to locally disrupt the flow of oil and to provide a pocket for receiving particles of foreign matter.

These and other objects and advantages of the invention will be more particularly pointed out in the accompanying specification and drawings in which:

Figure 1 is a sectional view of hydrodynamic power transmitting device constructed according to the invention and illustrating the provision of sludge eliminating means in accordance with the invention.

Figure 2 is an enlarged perspective view of a portion of the sludge trap fixed to the housing cover.

Figure 3 is an enlarged sectional view of a portion of the container housing, seal, and sludge trap in assembled relationship.

Figure 4 is a sectional view of a portion of the modified container, seal, and dirt trap in assembled relationship wherein the side walls of the dirt trap are perpendicular to the axis of rotation of the housing.

Hydrodynamic torque transmitting mechanisms such as fluid couplings and torque converters are commonly employed in vehicles, particularly in connection with automatic transmissions. In such installations it is common practice to utilize the working fluid of the torque transmitting device for lubrication of the gearing unit driven by the hydrodynamic torque transmitting device and to continuously circulate the fluid through the torque transmitting device. Experience has shown that through use, sludge and sediment forms in the working fluid which is harmful to the system. In addition, it has been found that in fluid torque transmitting devices composed of detachable sections, there is a definite tendency for oil to leak at the plane of juncture of the two sections. There is therefore provided herein a sludge trap in the torque transfer mechanism effective both to trap sediment and to cooperate with sealing means to prevent oil leakage.

In the accompanying drawings, 1 indicates a drive shaft adapted to be driven by an engine, not shown, and attached to a flywheel 2 to rotate the same. A ring gear 3 on flywheel 2 may cooperate with an engine starting device, not shown, to start the engine. A torus cover 5 is detachably secured to flywheel 2 by a series of bolts 4 so that the flywheel and torus cover may be readily detached for servicing purposes. At the plane of juncture of the torus cover and flywheel there is provided a seal 6, preferably an O ring seal of resilient material adapted to be compressed into a seal receiving channel formed by the adjacent walls of the torus cover and flywheel. In assembled relationship the torus cover and flywheel enclose a chamber indicated at 12. As shown in Figures 3 and 4, the wall of flywheel 2 at its juncture with torus cover 5 is substantially perpendicular to the axis of rotation of the flywheel, while the wall of the torus cover is recessed at an angle to plane of rotation so that a pocket is provided into which the seal 6 may be inserted. Fixed to flywheel 2 is an annular U-shaped channel section 10 having spaced side walls 7 and 8, and a base 9. In the modified form of Figure 4, the channel member is similar to channel 10 of Figure 3 modified in shape, the parts of Figure 4 being similar to those of Figure 3 but modified somewhat and carrying the same numerals as found in Figure 3 but being prime numerals.

Side wall 7 may be welded to flywheel 2 so that the channel section is removable with the flywheel. It will be readily understood that in assembled relationship, the base 9 of channel 10 will cooperate with the O ring seal to compress the seal into contact with the walls of the flywheel and torus cover. As shown, when the torus cover and flywheel are assembled, the O ring is compressed to approximate the shape of a right angle triangle in cross section. Channel section 10 overlies the plane of juncture of the flywheel and torus cover to catch oil thrown outwardly and thereby performs a sealing function in and of itself. In addition, any distortion of the base 9 due to high speed rotation of the channel will cause further compression of the O ring seal to increase the sealing action. In the various figures the path of oil flow is indicated by the arrows and the areas of concentration of foreign matter are indicated by the dots. It will be apparent that particles of foreign matter impinge upon the wall of torus cover 5 and are carried by oil flow to the channel section side wall 8. Wall 8 locally disrupts the flow of oil and provides a collecting pocket or area exterior of the channel and between the channel and torus cover 5 for receiving particles of foreign matter. The wall 8 provides for cleaning the oil of dirt and small metal particles during initial operation of a new device and provides a trap for permanently collecting any additional foreign matter such as sludge which may be formed in the oil during the life of the device. It will be understood that foreign matter may also collect between the side walls 8 and 9 of the channel. However, wall 8 by presenting a locally disrupting dam to the flow of oil will cause most of the foreign particles to collect between torus cover 5 and side wall 8 on the exterior of the channel as indicated. In effect, therefore, two dirt collecting areas are provided, one exterior to and one within the annular channel member.

In order to transmit power through the hydrodynamic torque transmitting device, an impeller 16 is operatively connected to torus cover 5 by means of a vibration dampener 13 splined to a sleeve 14, the impeller 16 having a hub 15 likewise splined to sleeve 14. A turbine 18 is supported upon a power output shaft 20, the shaft 20 being supported in a bushing 19 in flywheel hub 21. Turbine 18 and shaft 20 are non-rotatable with respect to each other so that the turbine can drive shaft 20 when impeller 16 is rotated at a sufficient speed. Thus, impeller 16 is driven by shaft 1 through the rotatable flywheel and torus cover, while turbine 18 drives shaft 20.

The heretofore described structure provides an annular channel member adapted to overlie an annular seal at the juncture of two detachable members to prevent working fluid from directly striking the seal under action of centrifugal force. The channel member compresses the seal to assure the sealing action. The channel member constitutes an effective dirt trap whereby sludge or other sediment is retained. The channel member is carried by the flywheel so as to be readily accessible for cleaning during periodic overhauls of the coupling unit.

While the invention has been illustrated herein in a fluid coupling unit, it is to be understood that the invention may be used in conjunction with other hydrodynamic torque transfer mechanisms such as, for example, hydraulic torque converters. In the embodiment shown in Figures 1 through 3 the channel section has one side wall of substantially greater depth than the other side wall and disposed at an angle greater than 90 degrees to the base. In Figure 4, both side walls are disposed at 90 degrees to the base. In either case, the channel member is disposed in the chamber 12 so as to overlap or extend axially across the plane of juncture of the two sections 2 and 5. In both cases the base of the channel acts upon the resilient seal to compress the same. In both embodiments, centrifugal force of oil acting in chamber 12 will cause sludge and dirt to be deposited in the annular channel.

What is claimed is:

1. In a transmission, power input and power output members, a hydrodynamic power transmitting device operatively connecting said members including a rotatable housing forming a chamber for working fluid, coupling means in said chamber including an impeller operatively connected to said power input member by said rotatable housing and a turbine operatively connected to said output member, said housing including a pair of members detachably secured together, an annular seal carried by said housing and positioned adjacent the point of juncture of said housing sections, an annular dirt collecting ring comprising a U-shaped channel member having spaced side walls joined by a base wall and having one side wall fixed to one of said housing sections and disposed in the outer radial zone of said chamber, said ring having the base wall thereof in contact with said seal to compress said seal into contact with both of said housing sections, the base wall of said channel section and one of said detachable housing sections presenting an open-faced annular dirt collecting section to working fluid in said chamber, the side walls and base wall of said channel section presenting a second open-faced annular chamber for receiving dirt from said working fluid, one of said side walls presenting an annular obstruction to flow of working fluid in the area of the opening to each of said chambers.

2. In a rotatable chamber formed of a pair of detachable members, an annular seal, an annular member carried by one of said detachable members extending into said rotatable chamber spaced radially inwardly from the other of said detachable members and contacting said annular seal to compress the same, said annular member having spaced side walls and a base wall forming an annular channel having an opening facing radially inwardly in said rotatable chamber and adapted to collect sludge from fluid in said chamber, the base wall of said channel member being effective to increasingly compress said seal with increase in speed of rotation of said detachable members.

References Cited in the file of this patent

UNITED STATES PATENTS

| | | |
|---|---|---|
| 2,168,862 | Sensaud de Lavaud | Aug. 8, 1939 |
| 2,603,984 | Swift | July 22, 1952 |
| 2,632,626 | McClintock | Mar. 24, 1953 |
| 2,768,722 | Muller | Oct. 30, 1956 |
| 2,792,716 | Christenson | May 21, 1957 |